United States Patent
Usami

(10) Patent No.: US 6,876,461 B2
(45) Date of Patent: *Apr. 5, 2005

(54) IMAGE PRINTING APPARATUS AND METHOD, COMPUTER-READABLE STORAGE MEDIUM STORING PROGRAM FOR PRINTING IMAGES, IMAGE MANAGEMENT SYSTEM, AND DATA MANAGEMENT DEVICE

(75) Inventor: Yasushi Usami, Wakayama (JP)

(73) Assignee: Noritsu Koki Co., Ltd, Wakayama (JP)

( * ) Notice: Subject to any disclaimer, the term of this patent is extended or adjusted under 35 U.S.C. 154(b) by 849 days.

This patent is subject to a terminal disclaimer.

(21) Appl. No.: 09/874,045

(22) Filed: Jun. 6, 2001

(65) Prior Publication Data

US 2002/0051189 A1 May 2, 2002

(30) Foreign Application Priority Data

Jun. 6, 2000 (JP) ........................................ 2000-169093

(51) Int. Cl.⁷ .............................................. G06K 15/00
(52) U.S. Cl. ..................................... 358/1.15; 358/1.18
(58) Field of Search ............................... 358/7.15, 1.18, 358/538, 403, 405, 450; 709/247, 217, 218, 225

(56) References Cited

U.S. PATENT DOCUMENTS

| 6,017,157 A | 1/2000 | Garfinkle et al. |
| 6,519,048 B1 * | 2/2003 | Tanaka ...................... 358/1.13 |
| 6,791,702 B2 * | 9/2004 | Tanaka ...................... 358/1.13 |

FOREIGN PATENT DOCUMENTS

| EP | 0 830 008 A | 3/1998 |
| EP | 0 835 011 A | 4/1998 |
| EP | 0 860 986 A | 8/1998 |
| EP | 0 898 278 A | 2/1999 |
| EP | 0 977 113 A | 2/2000 |
| KR | 2001-0077794 A | 8/2001 |

* cited by examiner

Primary Examiner—Arthur G. Evans
(74) Attorney, Agent, or Firm—Smith Patent Office

(57) ABSTRACT

To enable easy image file management, while allowing a user at an Internet terminal to access image files effortlessly, a printing control device uploads image files stored in an auxiliary storage section to an image management device connected via the Internet, and prints an image on the basis of the image file by means of a printer. In the printing control device, a URL acquisition section obtains a URL corresponding to a directory of the image management device on the basis of the input user ID; an image file transmission section uploads the image file to the acquired URL; and in a print processing section, it prints the acquired URL, along with an image based on the image file.

13 Claims, 10 Drawing Sheets

FIG. 9

| USER ID | HOME DIRECTORY | IMAGE STORAGE DIRECTORY |
|---|---|---|
| ID1 | ¥ID1 | ¥ID1¥1001 |
| | | ¥ID1¥1002 |
| | | ¥ID1¥1003 |
| | | ¥ID1¥1004 |
| | | ¥ID1¥1005 |
| | | ¥ID1¥1006 |
| ID2 | ¥ID2 | ¥ID2¥2001 |
| | | ¥ID2¥2002 |
| | | ¥ID2¥2003 |

IMAGE PRINTING APPARATUS AND METHOD, COMPUTER-READABLE STORAGE MEDIUM STORING PROGRAM FOR PRINTING IMAGES, IMAGE MANAGEMENT SYSTEM, AND DATA MANAGEMENT DEVICE

BACKGROUND OF THE INVENTION

1. Field of the Invention

This invention relates to an image printing apparatus for printing images on the basis of an image file, and to technology for sending and receiving images files to and from a data management device managing image files, which is connected to an image printing apparatus via the Internet.

2. Discussion of the Related Art

In the field of providing photography-related services, a photographer takes a film from a camera, or a memory card from a digital camera, to a mini-lab store, and photographs are developed and printed, or the like, on the basis of the image data (image files) contained on the film or memory card, by means of a prescribed printing control device situated in the mini-lab store.

Conventionally, a printing control device of this kind, a personal computer (hereinafter, called a "PC") located in a normal home, and a prescribed image management device which centrally manages image files uploaded from the printing control device or a PC, are mutually connected by means of the Internet, and an image management system is formed by connection of these devices.

In particular, in the printing control device of such an image management system, an image file corresponding to a photograph is uploaded from the printing control device to a prescribed URL (Uniform Resource Locator) on the image management device, and a photographer is able to search for the image managed by the image management device, by accessing the corresponding URL from a PC.

However, in a conventional image management system as described above, in order that the PC user (photographer) can access an image file managed by the image management device, the operator of the printing control device (an employee of the mini-lab store) must indicate the URL corresponding to the directory generated in the image printing apparatus during upload, to the PC user, and must also manage URLs for a large number of users, and hence the tasks required of the operator of the printing control device are very complicated.

SUMMARY OF THE INVENTION

It is an object of the present invention to provide an image printing apparatus and method, an image printing program, an image management system, a data management device which are free from the problems residing in the prior art.

It is another object of the present invention to provide an image printing apparatus which enables image files in a connected data management device to be managed in a simple fashion, and which allows ready access to image files by a user at a terminal of a network.

According to an aspect of the present invention, image files stored in a storage section are transmitted from an image printing apparatus to a data management device connected thereto via a network. Images are printed based on the image files in the image printing apparatus. First data indicating a user ID is transmitted to a data management device from the image printing apparatus. The image printing apparatus receives second data indicating a URL corresponding to the user ID sent by the data management device in response to the transmission of the first data; transmits a stored image file to the URL corresponding to the received second data; and prints the image based on the image file, along with the URL corresponding to the received second data.

The data management device may also generate a new directory within a directory corresponding to the URL relating to the user ID, and transmit a third data indicating the URL corresponding to the new directory instead of the second data; the image printing apparatus receiving the third data, transmitting a stored image file to the URL corresponding to the received third data; and printing the URL corresponding to the received third data.

These and other objects, features, aspects, and advantages of the present invention will become more apparent from the following detailed description of the preferred embodiments/examples with reference to the accompanying drawings.

BRIEF DESCRIPTION OF THE DRAWINGS

FIG. 9 is a diagram showing a user information management table used during execution of URL setting processing.

DETAILED DESCRIPTION OF THE PREFERRED EMBODIMENTS

Figure 1:
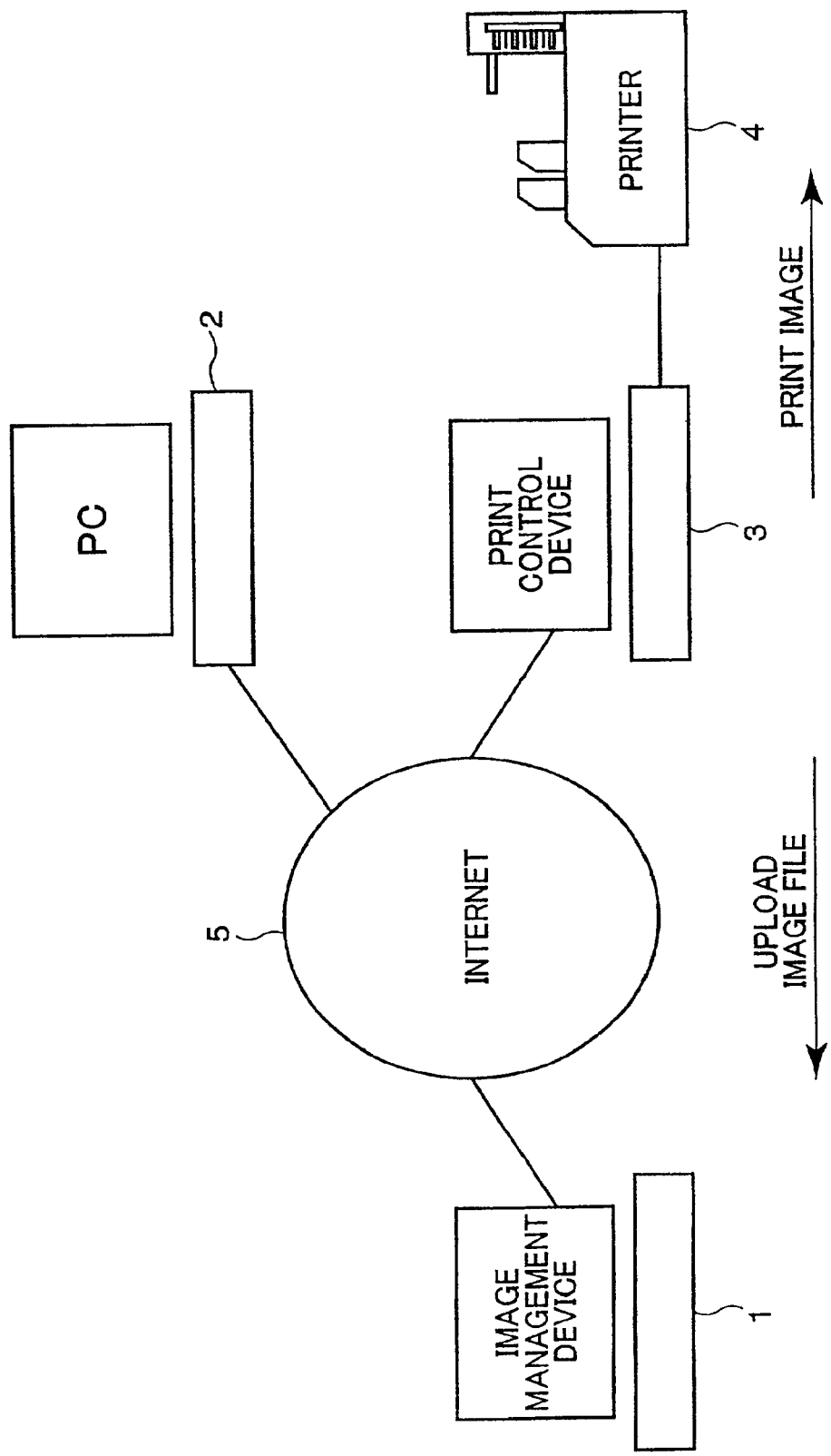
FIG. 1 is a diagram showing a general construction of an image management system according to an embodiment of the present invention.

An image management system according to an embodiment of the present invention is described below with reference to the drawings. Referring to FIG. 1 showing a general construction of a image management system, the image management system comprises a PC 2 for receiving image print and display instructions, and the like, from a user, situated in a normal home; a printing control device 3 for controlling a printer 4 for developing and printing photographs, and the like, situated in a mini-lab store; and an image management device 1 which centrally manages image files transmitted from the PC 2 or the printing control device 3; the image management device 1, PC 2 and printing control device 3 being connected by means of the Internet 5.

Here, in particular, it is supposed that image files corresponding to photographs are generated in the mini-lab store from a camera film or a digital camera memory card taken to the store by the photographer, these image files being stored in the printing control device 3, and the following description will centre on the processing performed by the printing control device 3 for uploading the image files to the image management device 1 and for printing images (photographs) on the basis of the image files by means of the printer 4.

Figure 2:
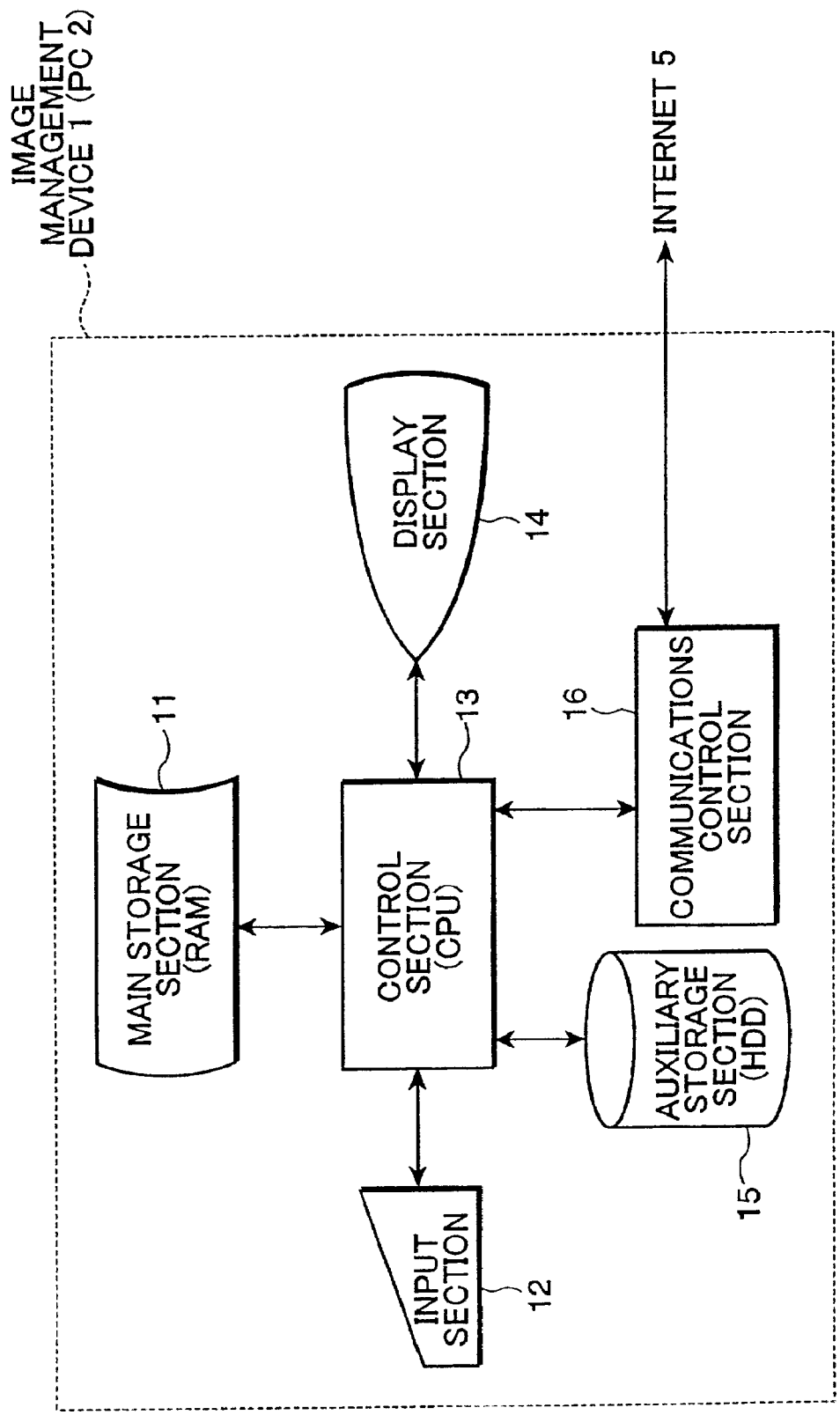
FIG. 2 is a block diagram showing a hardware construction of an image management device comprised in the image management system.
Figure 3:
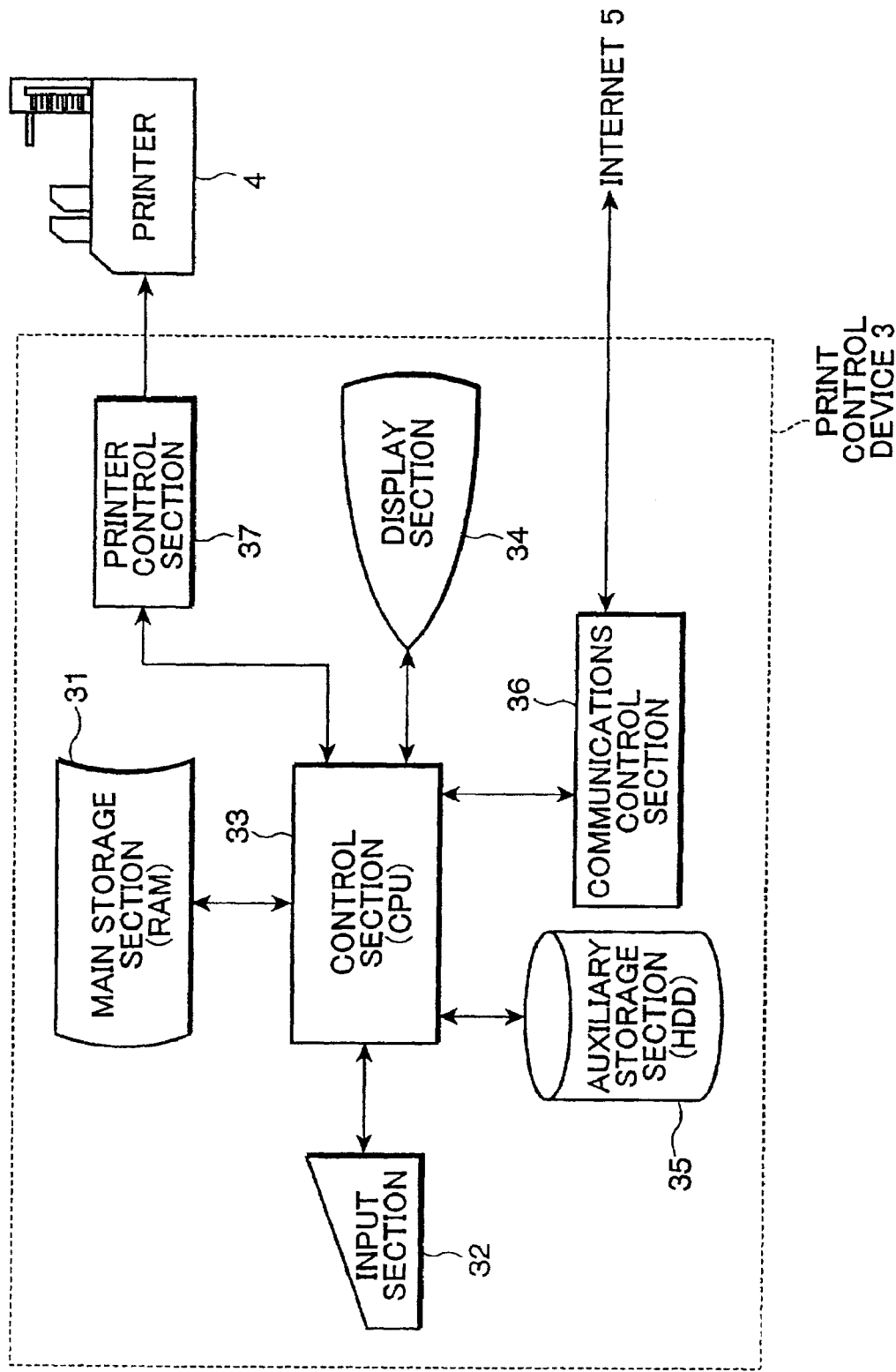
FIG. 3 is a block diagram showing a hardware construction of a print control device comprised in the image management system.

FIG. 2 is a block diagram showing the hardware construction of an image management device comprised in the present image management system (same applies to PC 2); and FIG. 3 is a block diagram showing the hardware construction of a printing control device 3 comprised in the present image management system.

As shown in FIG. 2, the image management device 1 (and PC 2) are standard programmable computers, provided with an input section 12 comprising a keyboard, mouse, or the like, for receiving inputs from the user, a display section 14 for providing a display to the user; a communication control section 16 for sending and receiving data via the Internet 5, an auxiliary storage section (HDD) 15 for storing programs and data, a main storage section (RAM) 11 for temporarily storing programs and data, and a control section (CPU) 13 for executing programs in the main storage section 11, whilst controlling the input section 12, display section 14 auxiliary storage section 15 and communications control section 16.

Furthermore, as shown in FIG. 3, similarly to the image management device 1, the printing control device 3 comprises an input section 32, display section 34, communications control section 36, auxiliary storage section 35, main storage section 31, and control section 33, and it is also provided with a printer control section 37 forming an interface with the printer 4, for controlling the printer 4.

In practice, software for causing the image management device 1 and the printing control device 3 to operate as a web server, database server, or the like, is installed on a prescribed OS in the hardware devices of the image management device 1 and the printing control device 3. Moreover, a special program for issuing develop and print instructions, and the like, to the printer 4 is installed in the printing control device 3, and a web browser and a program for generating an image file from a digital camera (using hardware providing a prescribed interface), or the like, is installed in the PC 2. The print-related processing performed by the printing control device 3, and the URL setting processing and image file reception processing performed by the image management device 1, which are subsequently illustrated in detail in FIG. 4 to FIG. 10, are executed by means of these software.

Figure 4:
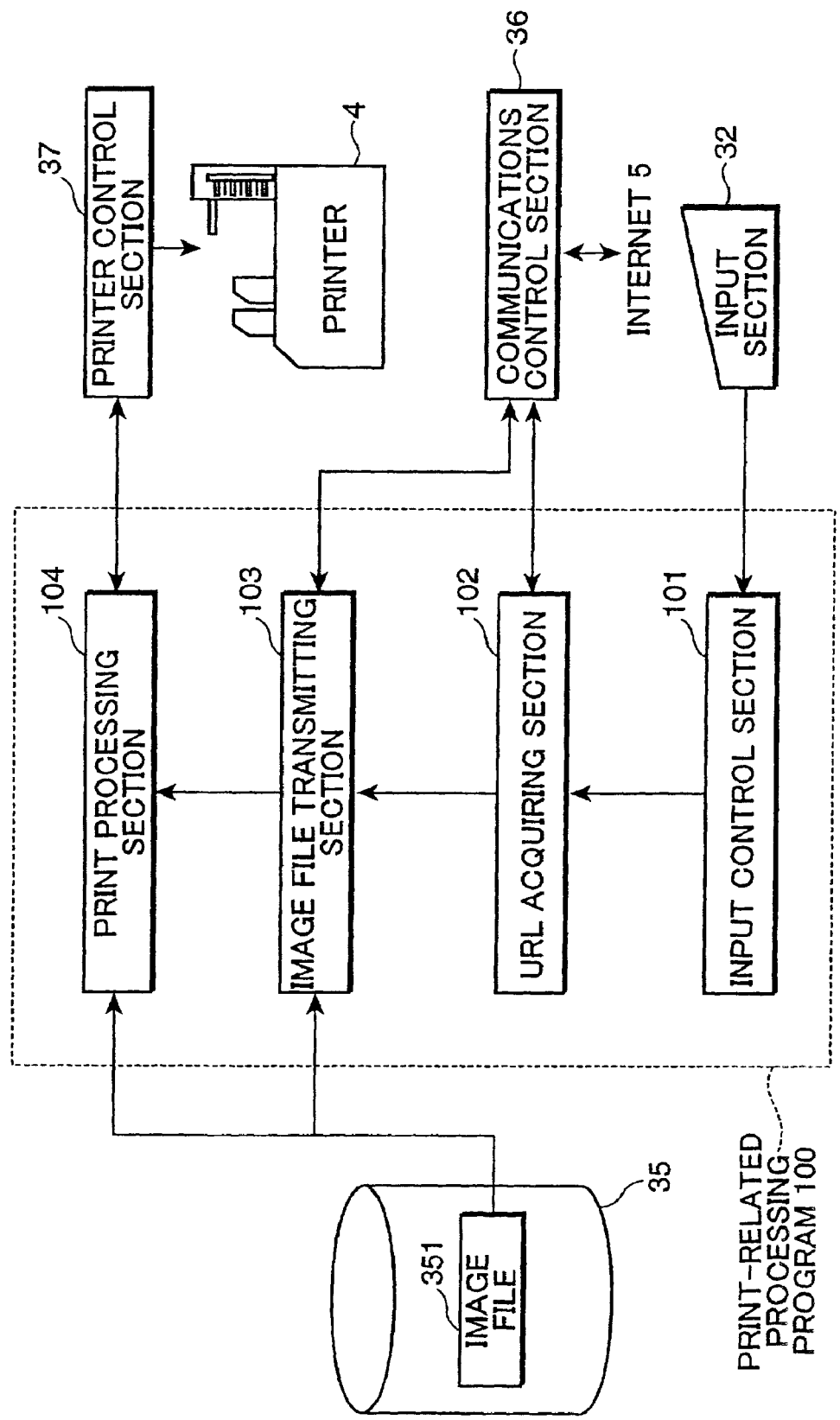
FIG. 4 is a block diagram showing a main construction of a print-related process program executed by a printing control device.
Figure 5:
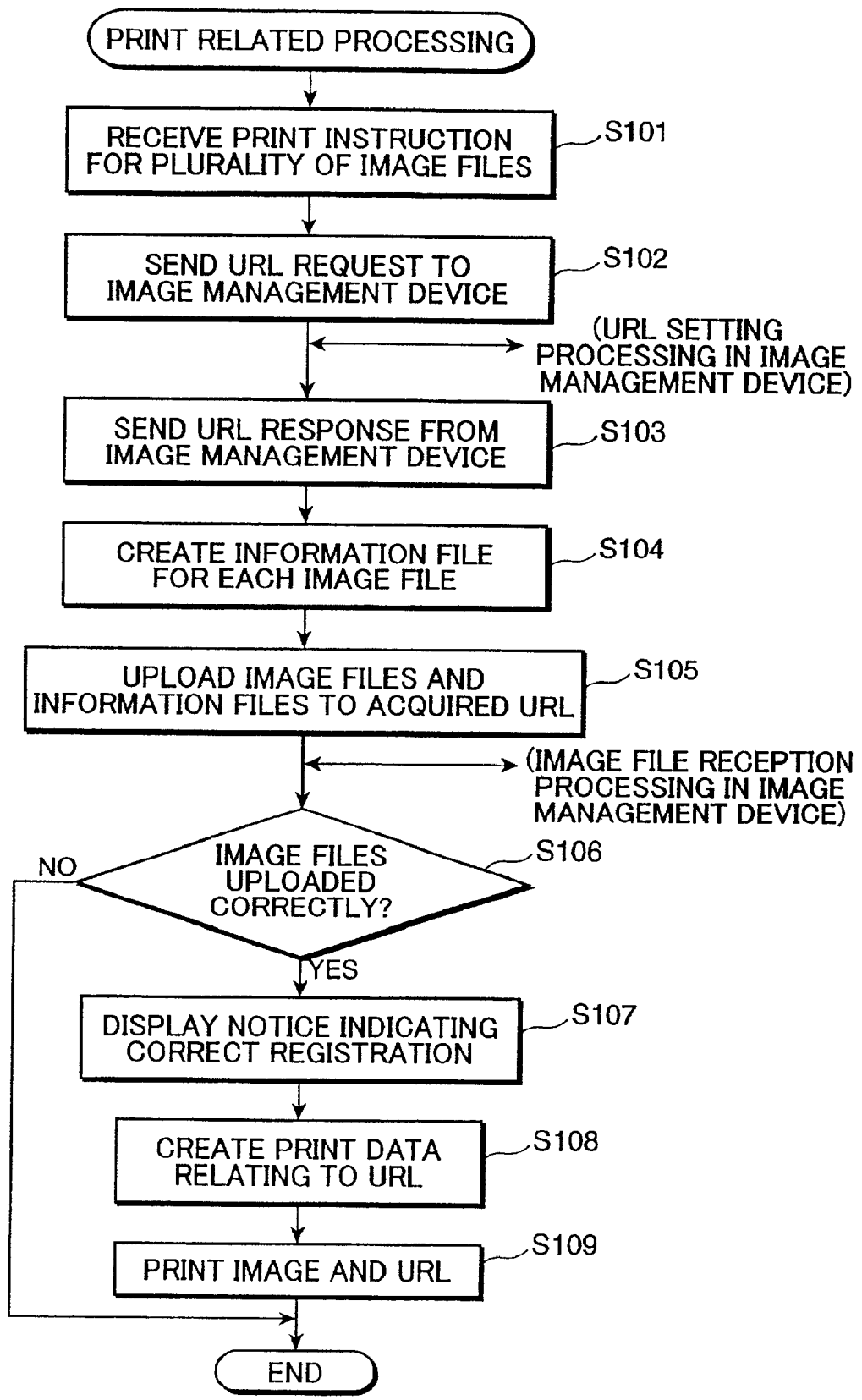
FIG. 5 is a flowchart illustrating a sequence of print-related processing.
Figure 6A:
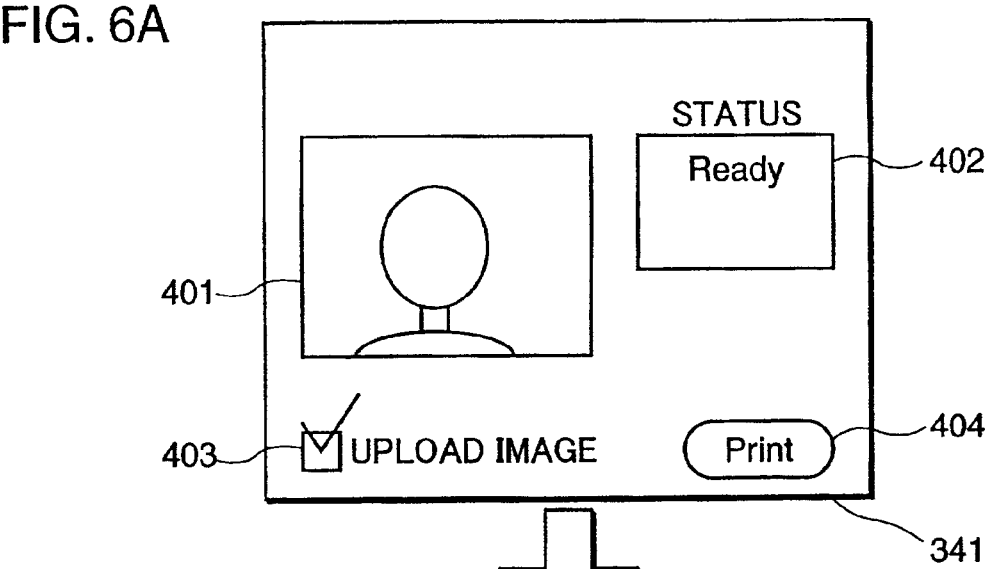
FIGS. 6A, 6B and 6C are diagrams showing an example of a screen displayed on a display section during execution of the print-related processing.
Figure 6B:
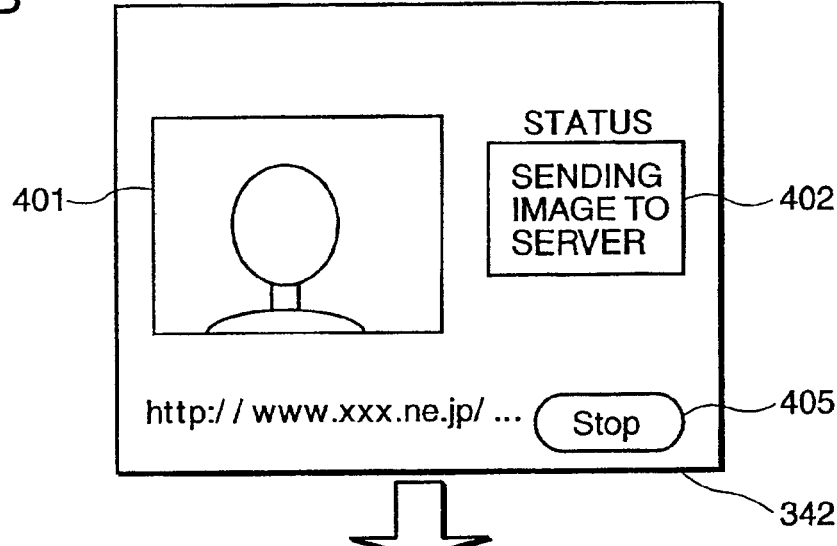
Figure 6C:
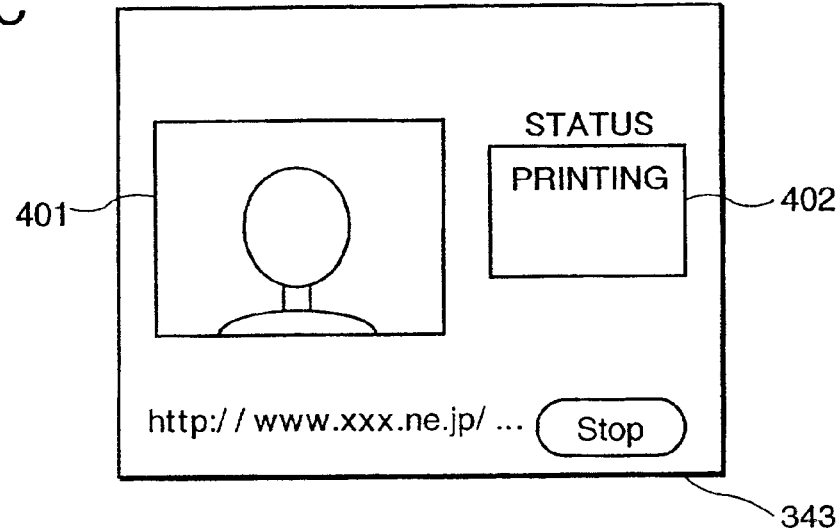

FIG. 4 is a block diagram showing a main construction of a print-related process program 100 as executed by the printing control device 3. FIG. 5 is a flowchart showing a sequence of the print-related processing, and FIG. 6 is a diagram illustrating an example of a screen displayed on the display section 34. FIGS. 6A, 6B and 6C respectively show screens displayed in association with the processing in steps S101, S105 and S109 of the print-related processing.

As shown in FIG. 4, when the printing-relating process program 100 is executed by the printing control device 3, an image file 351 corresponding to the image to be printed is stored in the auxiliary storage section 35 (see FIG. 3).

The print-related process program 100 comprises: an input control section 101 for accepting input of print or upload instructions, or the like, relating to the image file 351, from the input section 32; a URL acquiring section 102 for obtaining a URL corresponding to the directory in the image management device 1 where the image file 351 is to be uploaded, from image management device 1, via the Internet 5; an image file transmission section 103 for uploading an image file 351 to the obtained URL; and a print processing section 104 for printing the image corresponding to the image file 351, and the URL obtained as described above, on printing paper, by means of the printer 4.

As shown in FIG. 5, in the print-related processing, firstly, in the input control section 101, a print instruction for a plurality of image files is received from an operator, and a user ID, or the like, for a user owning image files is input (step 101, hereinafter "step" is abbreviated to S). Here, it is assumed that one image file corresponding to one image, and that, usually, a plurality of image files obtained from one film are processed together.

On the screen 341 shown on the display section 34 in FIG. 6A, the image that is to be printed is displayed in the image display region 401, and the operational status of the printing control device 3 is shown in the status display region 402. An instruction to upload the image displayed in the image display region 401 is given or not given depending on the presence or absence of a check mark in the check box 403, and a printing command is given by clicking on the print command button 404 (aligning the mouse cursor with the button and clicking on the mouse button). Print commands for individual images are given repeatedly for a plurality of images (corresponding to one film), whereupon the print command operation is completed.

By issuing a print command in this manner, in the URL acquiring section 102, a URL request containing the user ID, image size and number of images, and the like, is sent to the image management device 1 (S102 in FIG. 5), whereupon, after URL setting processing performed by the image management device 1 and illustrated in detail hereinafter in FIG. 8 and so on, a URL response is received from the image management device 1 (S103). Thereupon, in the image file transmission section 103, an information file containing the user ID, image file name, and the URL for uploading is created (S104) for each image file to be printed and uploaded, and the image files and information files are uploaded to the obtained URL (S105).

In the screen 342 shown on the display section 34 illustrated in FIG. 6B, in the status display region 402 it is indicated that the image displayed in the image display region 401 is being sent to the image management device 1, and the user is able to interrupt this transmission by clicking on the pause command button 405.

When these image files (and information files) are uploaded, image file reception processing is performed by the image management device 1, as described in detail hereinafter with reference to FIG. 10 and so on, and on the basis of a notification from the image management device 1, in the image file transmission section 103, it is determined whether or not the image file has been uploaded correctly (S106 in FIG. 5). If the image file has not been uploaded correctly (No at S106), then the current printing-relating processing is terminated, whereas if the image file has been uploaded correctly (Yes at S106), then a notice indicating correct upload thereof is displayed on the display section 34 (S107), whereupon, in the print processing section 104, print data relating to the obtained URL is created (S108), an image corresponding to the image file is printed onto a single sheet of printing paper, an image (text) indicating the URL corresponding to the directory of the image management device 1 where the image file is stored is printed onto a portion of the printing paper, or the margin or reverse side thereof, and this printing operation is then repeated for all of the plurality of images obtained at S101 (S109), whereupon the current printing-relating processing terminates.

In practice, in the screen 343 shown on the display section 34 illustrated in FIG. 6C, the display in the status display region 402 indicates that the image shown in the image display region 401 is being printed by the printer 4, and this printing operation of one image onto one sheet of paper is repeated for the plurality of images, whereupon printing terminates.

Figure 7:
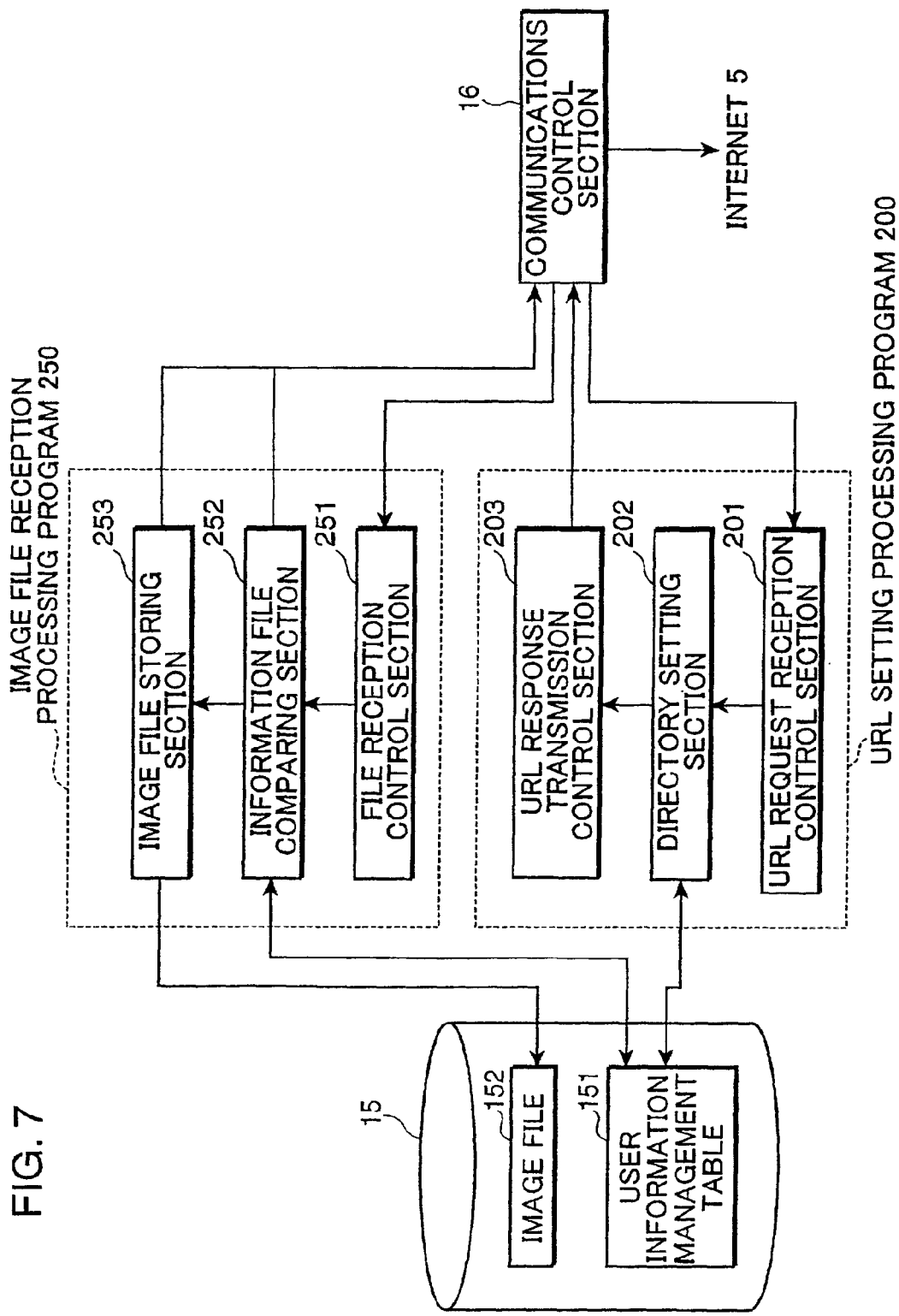
FIG. 7 is a block diagram showing a main construction of a URL setting process program and an image file reception processing program, as executed by the image management device.

FIG. 7 is a block diagram showing a main construction of a URL setting process program 200 and an image file reception process program 250 as executed by the image management device 1. FIG. 8 is a flowchart showing a sequence of URL setting processing, and FIG. 9 is a diagram showing a user information management table as used during execution of the URL setting processing. Furthermore, FIG. 10 is a flowchart showing a sequence of image file reception processing.

As shown in FIG. 7, when the URL setting process program 200 is executed by the image management device 1, the user information management table 151 is stored in the auxiliary storage section 15 (see FIG. 2), and when the image file reception process program 250 is executed, image files 152 are stored in the auxiliary storage section 15.

The URL setting process program 200 comprises: a URL request reception control section 201 for receiving a URL request from the printing control device 3 via the Internet 5; a directory setting section 202 for setting a directory for storing the image files to be uploaded, whilst referring to the user information management table 151, in response to a URL request; and a URL response transmission control section 203 for transmitting a URL response indicating a URL corresponding to a specified directory, to the printing control device 3. The image file reception process program 250 comprises: a file reception control section 251 for receiving image files from the printing control device 3; an information file comparing section 252 for referencing the user information management table and comparing same with the information files received in association with the image files; and an image file storing section 253 for storing image files received from the printing control device 3 in the auxiliary storage section 15, in the directory thereof specified by the URL setting processing.

Figure 8:
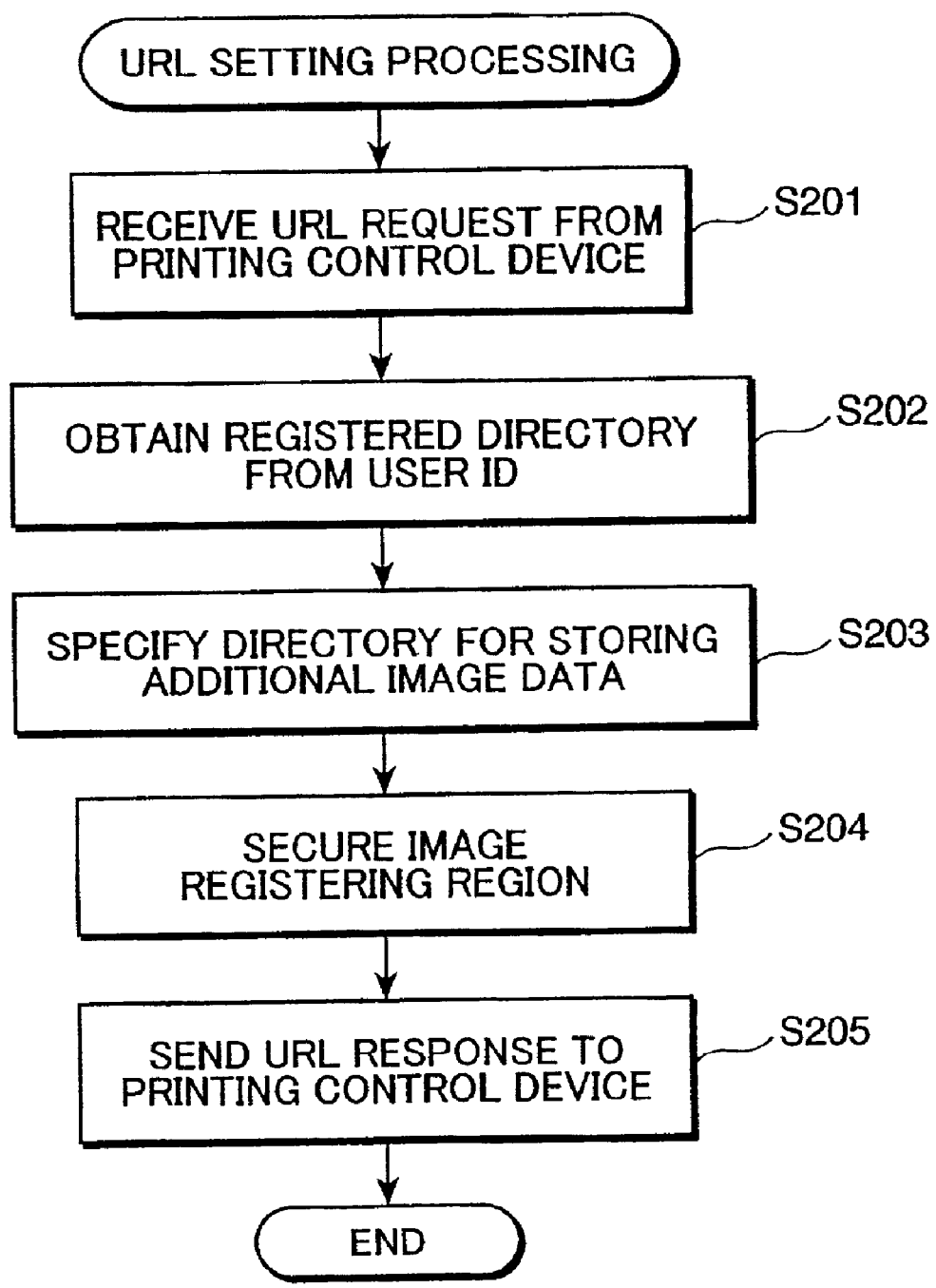
FIG. 8 is a flowchart illustrating a sequence of URL setting processing.

As shown in FIG. 8, in the URL setting processing, firstly, a URL request transmitted by the printing control device 3 by means of the processing at S102 in the aforementioned print-related processing, is received in the URL request reception control section 201 (S201). Thereupon, in the directory setting section 202, the user information management table 151 is referenced and a previously registered home directory corresponding to the user ID is identified (S202), a new image storage directory for storing new image files is specified within the identified home directory (S203), and a region for recording the image files is secured according to image size contained in the URL request (S204).

In practice, as shown in FIG. 9, in the user information management table, the image storage directories specified within the home directory are associated with the user ID and the home directory. When a new image storage directory is set up with respect to a newly uploaded image file, for example, when a new image file is uploaded relating to a user having the user ID "ID2", then a new image storage directory "/ID2/2004" is set up in relation to the already existing image storage directories "/ID2/2001"–"/ID2/2003". (This kind of image storage directory is set up, for example, each time a print instruction is issued by the printing control device 3 with regard to a plurality of image files relating to one film; and the name of the image storage directory can be set on the basis of the date and time, rather than on the basis of consecutive numbering as described above.)

Thereupon, a URL response indicating the URL corresponding to the directory thus set is transmitted to the printing control device 3 (S205 in FIG. 8), and URL setting processing then terminates.

Figure 10:
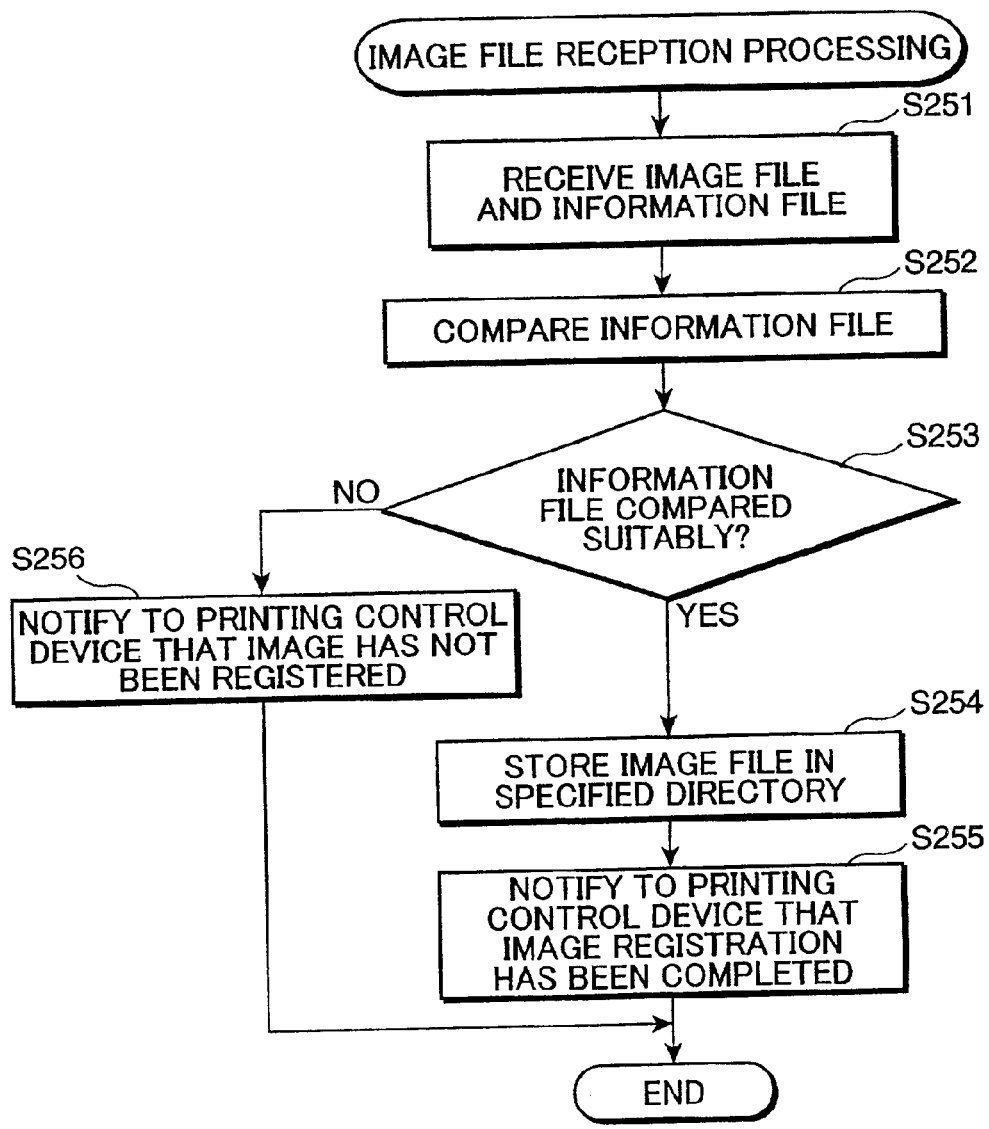
FIG. 10 is a flowchart illustrating a sequence of image file reception processing.

As shown in FIG. 10, in the image file reception processing, firstly, image files uploaded from the printing control device 3 by the processing at S105 of the printing-relating process described above, and information files corresponding to each of these image files, are received (S251) in the file reception control section 251 (see FIG. 7), and in the information file comparing section 252, the (directory of the image management device 1 corresponding to the) user ID and URL in the information files is compared with the user information management table (S252), and it is determined whether or not the (user ID and URL) in the information file is appropriate (S253).

If the information file is not appropriate (No at S253), then the image files are not uploaded, a notice indicating this is sent to the printing control device 3 (S256), and the current image file reception processing operation terminates, whereas if the information file is appropriate (Yes at S253) then in the image file storage section 253, the image files are stored in the specified directory corresponding to the URL (S254), and the printing control device 3 is notified that uploading of images has been completed (S255), whereupon the current image file reception processing terminates.

By means of the print-related processing performed by the print control device 3, and the URL setting processing and image file reception processing performed by the image management device 1, image files are uploaded to the image management device 1 as images are printed by the printer 4, in accordance with print instructions from the printing control device 3, and furthermore, at the printer 4, an image corresponding to an image file is printed onto the surface of printing paper, and the URL corresponding to the directory of the image management device 1 where that image file is stored is printed onto a portion of the printing paper, or the margin or reverse side thereof.

Thereby, management of the uploaded image files can be achieved readily whilst generating new directories in the image management device 1, and the user is hence able to access image files corresponding to photographs, readily and effortlessly, by confirming the URLs (corresponding to a newly specified directory) displayed on the photographs, and inputting these URL into a web browser running on a PC.

Moreover, the user (photographer) is also able to convey the URLs on the photographs to a third party, by email, telephone, or the like. A third party receiving a URL in this way can then access the image file corresponding to the photograph, check the image, and the third party can then convey the URL to a mini-lab store in his or her own vicinity and instruct them to print a desired photograph. In other words, a relative, friend, or the like, or the user, living in a distant location and being informed of the URL by the user is able to obtain prints as he or she desires, without being subject to time restrictions, or the like.

Moreover, since the image management device 1 stores the user ID and the URL corresponding to the directory where the image files are stored, it is not necessary for these to be managed by the printing control device 3 (at the mini-lab store), and hence the mini-lab is not required to perform complicated tasks, such as managing URLs, conveying URLs to users (photographers), and the like.

In the image management system according to the aforementioned embodiment, it was assumed that one image is printed onto one sheet of printing paper, but it is also possible to print a plurality of images onto one sheet of printing paper, by means of an index print, or the like, and to print the URLs corresponding to each one of these images onto the same sheet of paper.

Moreover, in the image management device comprised in the image management system according to this embodiment, it is also possible for the user to specify the position on the paper at which the URL is to be printed.

As described above, an inventive image printing apparatus for transmitting image files stored in a storage section to a prescribed data management device connected via a network, and printing images on the basis of the image files; comprises: a first transmitter which transmits first data indicating a user ID to the data management device; a receiver which receives second data indicating a URL corresponding to the user ID, sent by the data management device in response to the transmission of the first data; a second transmitter which transmits a stored image file to the URL indicated by the received second data; and a printing portion for printing the image based on the image file, along with the URL indicated by the received second data.

It may be preferable that the data management device generates a new directory within a directory corresponding to the URL relating to the user ID, and transmits a third data indicating the URL corresponding to the new directory instead of the second data; the receiver receives the third data; the second transmitter transmits a stored image file to the URL indicated by the received third data; and the printing portion prints the URL indicated by the received third data.

An inventive printing method for transmitting image files stored in a storage section to a prescribed data management device connected via a network, and printing images on the basis of the image files, the image printing method comprising the steps of: transmitting first data indicating a user ID to the data management device; receiving second data indicating a URL corresponding to the user ID, sent by the data management device in response to the transmission of the first data; transmitting a stored image file to the URL indicated by the received second data; and printing the image based on the image file, along with the URL indicated by the received second data.

An inventive program for transmitting image files stored in a storage section to a prescribed data management device connected via a network, and printing images on the basis of the image files, is designed such that: first data indicating a user ID is transmitted to the data management device; second data indicating a URL corresponding to the user ID, that is sent by the data management device in response to the transmission of the first data, is received; a stored image file is transmitted to the URL indicated by the received second data; and the image based on the image file, along with the URL indicated by the received second data are printed.

The program may be stored in a computer-readable storage medium.

An inventive image management system comprises an image printing apparatus for printing images on the basis of image files, and a data management device for managing image files, which is connected to the image printing apparatus via a network. The image printing apparatus comprises: a first transmitter which transmits first data indicating a user ID to the data management device; a first receiver which receives second data indicating a URL corresponding to the user ID, sent by the data management device in response to the transmission of the first data; a second transmitter which transmits a stored image file to the URL indicated by the received second data; and a printing portion which prints the image based on the image file, along with the URL indicated by the received second data. The data management device comprises: a memory which stores user IDs and URLs allocated to users, in mutually corresponding fashion; a second receiver which receives the first data transmitted by the image printing apparatus; an identifier which identifies the URL associated with the user ID indicated by the received first data; and a third transmitter which transmits second data indicating the identified URL, to the image printing apparatus.

An inventive image printing method uses with an image printing apparatus for printing images on the basis of image files, and a data management device for managing image files, which is connected to the image printing apparatus via a network. The data management device stores user IDs and URLs allocated to users in mutually corresponding fashion, before printing images; the image printing apparatus transmits first data indicating a user ID to the data management device; the data management device identifies the URL associated with the user ID indicated by the first data transmitted by the image printing apparatus, and transmits second data indicating the identified URL to the image printing apparatus. The image printing apparatus transmits a stored image file to the URL that is indicated by the second data transmitted by the data management device, and prints an image on the basis of the image file, along with the URL indicated by the transmitted second data.

The network may be the Internet.

Accordingly, an image file stored in a printing control device is transmitted in accordance with an URL (directory) specified by a data management device, and this URL is printed along with the image based on the image file. Thereby, management of image files by the data management device can be performed readily, and image files can be accessed smoothly by a user at an Internet terminal.

Also, an image file stored in a printing control device is transmitted in accordance with a URL corresponding to a directory newly created by a data management device, and this URL is printed along with the image based on the image file. Thereby, management of images files by the data management device can be performed readily, and image files can be accessed smoothly by a user at an Internet terminal.

This application is based on patent application No. 2000-169093 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An image printing apparatus for transmitting image files stored in a storage section to a prescribed data management device connected via a network, and printing images on the basis of the image files; comprising:
    a first transmitter which transmits first data indicating a user ID to the data management device;
    a receiver which receives second data indicating a URL corresponding to the user ID, sent by the data management device in response to the transmission of the first data;
    a second transmitter which transmits a stored image file to the URL indicated by the received second data; and
    a printing portion for printing the image based on the image file, along with the URL indicated by the received second data.

2. The image printing apparatus according to claim 1, wherein the data management device generates a new directory within a directory corresponding to the URL relating to the user ID, and transmits a third data indicating the URL corresponding to the new directory instead of the second data;
    the receiver receives the third data;
    the second transmitter transmits a stored image file to the URL indicated by the received third data; and
    the printing portion prints the URL indicated by the received third data.

3. The image printing apparatus according to claim 1, wherein the network is the Internet.

4. An image printing method for transmitting image files stored in a storage section to a prescribed data management device connected via a network, and printing images on the basis of the image files, the image printing method comprising the steps of:
    transmitting first data indicating a user ID to the data management device;
    receiving second data indicating a URL corresponding to the user ID, sent by the data management device in response to the transmission of the first data;
    transmitting a stored image file to the URL indicated by the received second data; and
    printing the image based on the image file, along with the URL indicated by the received second data.

5. The image printing method according to claim 4, wherein the network is the Internet.

6. A computer-readable storage medium storing a program for transmitting image files stored in a storage section to a prescribed data management device connected via a network, and printing images on the basis of the image files, wherein the program is designed such that:
    first data indicating a user ID is transmitted to the data management device;
    second data indicating a URL corresponding to the user ID, that is sent by the data management device in response to the transmission of the first data, is received;
    a stored image file is transmitted to the URL indicated by the received second data; and
    the image based on the image file, along with the URL indicated by the received second data are printed.

7. The computer-readable storage medium according to claim 6, wherein the network is the Internet.

8. An image management system comprising an image printing apparatus for printing images on the basis of image files, and a data management device for managing image files, which is connected to the image printing apparatus via a network,
    wherein the image printing apparatus comprises:
        a first transmitter which transmits first data indicating a user ID to the data management device;
        a first receiver which receives second data indicating a URL corresponding to the user ID, sent by the data management device in response to the transmission of the first data;
        a second transmitter which transmits a stored image file to the URL indicated by the received second data; and
        a printing portion which prints the image based on the image file, along with the URL indicated by the received second data; and
    wherein the data management device comprises:
        a memory which stores user IDs and URLs allocated to users, in mutually corresponding fashion;
        a second receiver which receives the first data transmitted by the image printing apparatus;
        an identifier which identifies the URL associated with the user ID indicated by the received first data; and
        a third transmitter which transmits second data indicating the identified URL, to the image printing apparatus.

9. The image management system according to claim 8, wherein the network is the Internet.

10. An image printing method for use with an image printing apparatus for printing images on the basis of image files, and a data management device for managing image files, which is connected to the image printing apparatus via a network, wherein:
    the data management device stores user IDs and URLs allocated to users in mutually corresponding fashion, before printing images;
    the image printing apparatus transmits first data indicating a user ID to the data management device;
    the data management device identifies the URL associated with the user ID indicated by the first data transmitted by the image printing apparatus, and transmits second data indicating the identified URL to the image printing apparatus; and
    the image printing apparatus transmits a stored image file to the URL that is indicated by the second data transmitted by the data management device, and prints an image on the basis of the image file, along with the URL indicated by the transmitted second data.

11. The image printing method according to claim 10, wherein the network is the Internet.

12. A data management device connectable with an image printing apparatus for printing images on the basis of image files via a network, the data management device adapted for managing image files, comprising:
    a memory which stores user IDs and URLs allocated to users in mutually corresponding fashion;
    a receiver which receives first data indicating a user ID transmitted by the image printing apparatus;
    an identifier which identifies the URL associated with the user ID indicated by the received first data; and
    a transmitter which transmits second data indicating the identified URL to the image printing apparatus.

13. The data management device according to claim 12, wherein the network is the Internet.

* * * * *